United States Patent [19]
Wissmann et al.

[11] 3,920,627
[45] Nov. 18, 1975

[54] POSITION 1 ANALOGS OF [PHENYLGLYCYL]⁸-ANGIOTENSION II

[75] Inventors: Hans Wissmann, Bad Soden, Taunus; Rolf Geiger; Ernst Lindner, both of Frankfurt am Main; Bernward Schölkens, Bad Soden, Taunus, all of Germany

[73] Assignee: Hoechst Aktiengesellschaft, Frankfurt am Main, Germany

[22] Filed: May 7, 1974

[21] Appl. No.: 467,832

[30] Foreign Application Priority Data
May 9, 1973  Germany................................ 2323322

[52] U.S. Cl................................ 260/112.5; 424/177
[51] Int. Cl.²................ C07C 103/52; A61K 37/26
[58] Field of Search................................. 260/112.5

[56] References Cited
UNITED STATES PATENTS
3,640,991  2/1972  Callahan........................... 260/112.5
3,725,380  4/1973  Konig et al. ...................... 260/112.5

OTHER PUBLICATIONS
Jorgensen et al.: J. Med. Chem., 14, 631–633 (1971).
Khairallah et al.: J. Med. Chem., 13, 181–184 (1970).
Khosla et al.: J. Med. Chem., 15, 792–795 (1972).
Hollemann et al.: Nature, 217, 277–278 (1968).
Stewart and Young, "Solid Phase Peptide Synthesis," W. H. Freeman and Co., San Francisco, 1969, pp. 45–46, 13–23.

Primary Examiner—Lewis Gotts
Assistant Examiner—Reginald J. Suyat
Attorney, Agent, or Firm—Curtis, Morris & Safford

[57] ABSTRACT

Peptides of the formula I

X—Arg—Val—Tyr—Ile—His—Pro—Phegly—OH     (I)

in which X represents the radical of an aliphatic carboxylic acid of up to 5 carbon atoms or the phthalic acid radical, and Phegly-OH represents L-C-phenylglycine, and a process of preparing them by condensing the O-tert. butyl ester of compound I, in which tyrosine is protected by tert. butyl, and X represents hydrogen, with carboxylic acids of the formula X—OH, in which X has the first mentioned meaning, according to the condensation methods usually employed in peptide chemistry.

8 Claims, No Drawings

POSITION 1 ANALOGS OF [PHENYLGLYCYL]⁸-ANGIOTENSION II

The present invention relate to new peptides having hypotensive activity and to a process for preparing them.

In particular, the present invention relates to new peptides of the general formula I.

X—Arg—Val—Tyr—Ile—His—Pro—Phegly—OH    (I)

in which X represents the radical or an aliphatic carboxylic acid of up to 5 carbon atoms which may be substituted by COOH—CONH$_2$—, NH$_2$—, CH$_3$NH— or carbobenzoxy-amino-(NHZ)- groups or the phthalic acid radical, and Phegly-OH represents L-C-phenylglycine.

The invention furthermore relates to a process for preparing the above-specified compounds of the general formula I, which comprises condensing the peptide derivative of the formula II H—Arg—Val—Tyr(Bu$^t$)—Ile—His—Pro—Phegly—OBu$^t$    (II)

according to the condensation methods usually employed in peptides chemistry with carboxylic acids of the formula X—OH, in which X has the meaning given above, and any additional amino and/or carboxyl groups must be protected by groups separable by hydrogenolysis or proton-solvolysis or 2 carboxyl groups are present in the form of their inner anhydrides, and subsequently separating the protective groups present by a treatment with strong acids and carbobenzoxy groups by catalytical hydrogenation.

As the carboxylic acid of the formula X-OH, there may be used, for example asparagine, isoasparagine, [=Asp(OH)NH$_2$], aspartic acid, sacrosine, β-alanine, glutamic acid, glutamine, N-methylglutamine and -asparagine, isoglutamine, and the N-carbobenzoxyderivatives thereof, succinic acid or glutaric acid, and their ω-amides.

Suitably protected derivatives of the compounds X—OH are, for example:

Boc—Asn—OH, Z—Asn—OH, Boc—Asp(OH)—NH$_2$, Z—Asp(OH)—NH$_2$, Z(CH$_3$)—Asp(NH$_2$)—(OH), Boc(Asp—OBu$^t$)—OH, Boc—Asp(Bzl)—OH, Z—Asp(OBu$^t$)—OH, Z—Asp(OBzl)—OH, Boc—Sar—OH, Z—Sar—OH, Boc—β-Ala—OH, Boc—Glu(OH)—NH$_2$, Z—Glu(OH)—NH$_2$, Boc(-Glu—OBu$^t$)—OH, Boc—Glu(Bzl)—OH, Z—Glu(OBu$^t$)—OH, Z—Glu(OBzl)—OH, succinic acid mono-benzyl or tert.butyl ester, glutaric acid monobenzyl or tert.butyl ester, furthermore phthalic acid mono-benzyl or tert. butyl ester and the anhydrides of succinic acid, glutaric acid or phthalic acid.

For carrying out the condensation of the reaction partners, all methods usually employed in peptide chemistry may be used. It is preferred to use dicyclohexylcarbodiimide (DCC), optionally in the presence of N-hydroxy-succinimide or 1-hydroxy-benzotriazole or analogous compounds described in Chem. Ber. 103 (1970), pages 788. The method via active esters, for example using 4-nitrophenol, 2,4,5-trichlorophenol, pentachlorophenol, N-hydroxysuccinimide or similar compounds, too, is possible. When using trichloro- or nitrophenyl esters, the aminolysis can be essentially accelerated by the addition of acid N-hydroxy compounds, for example those described in "Chemistry and Biology of Peptides", Ed. J. Meienhofer, Ann Arbor Science Publishers, 1972, pages 343–350. Especially suitable catalysts are, for example 1-hydroxy-benzotriazole and 2-hydroxy-pyridine. As solvent, there may be used dimethylformamide, dimethylacetamide, phosphoric acid tris-dimethylamide or dimethyl-sulfoxide, optionally in admixture with one another.

In the case of succinic acid, glutaric acid and phthalic acid, the inner anhydrides too may be used as activated compounds in which the second carboxyl group does not require special protection, because it is set free in known reaction later on during aminolysis. For this reaction, pyridine is also suitable as solvent. The ω-amino-acyl compounds are prepared from dicarboxylic acid mono-amides or from their activated esters according to the methods usually employed in peptide chemistry. The tert.-butyl ester groups and tert.-butyloxycarbonyl groups are separated from the reaction products by treatment with strong acids, for example trifluoroacetic acid or about 1.5N HCl in glacial acetic acid, and benzyl ester by catalytic hydrogenation. Benzyloxycarbonyl groups may be preserved in the final products, whereby the activity is maintained or is in some cases increased, but they may also be separated in the usual manner by catalytic hydrogenation.

Numerous analogs of angiotensin II are known which in part also have an antagonistic action. According to J. Med. Chemistry 15, 792–795 (1972), in view of prior experience strong angiotensin inhibitors are to be expected upon an exchange of amino acids in angiotension-II only if the aromatic ring of phenyl-alanine in the 8-position is replaced by an alicyclic or a branched aliphatic radical. In contradistinction thereto, the compounds of the invention have a very strong inhibiting action and are as well active for a longer period of time than other angiotensin inhibitors. It was surprising that, contrary to the opinion held up to now, the superior activity was attained by retaining the aromatic radical in the 8-position but by eliminating the aliphatic —CH$_2$— bridge.

The compounds of the invention are diagnostic agents which may be used for the differential diagnosis of hypertonia and the treatment of renin-angiotensin-induced forms of hypertonia.

The angiotensin antagonists of the present invention are administered in the form of pharmaceutical preparations. For diagnostic purposes, the preparations may be used, for example, in the form of aqueous solutions or of lyophilized products.

Such an aqueous solution contains, as single dose in 1–2 ml, 6 to 100 mcg of angiotensin antagonist. Isotony is produced with NaCl. For conservation, 0.05–2% of a conserving agent, for example phenol, benzyl alcohol, trichloro-isobutanol or 4-hydroxy-benzoic acid ester (methyl or ethyl ester) are added. The solutions are filled into ampules or bottles of a capacity of 1–2 ml.

The preparation of the invention in freeze-dried form contains, in addition to the angiotensin antagonist (6–100 mcg per single dose), an inert carrier, for example mannitol or sorbitol, and the quantity of NaCl required for preparing the isotonic solution. The preparation is freeze-dried in ampules or bottles. For administration, the preparation is then dissolved in 1–2 ml of bi-distilled water.

If a preparation is to be used in the treatment of malign hypertonia for a continuous drip infusion, the contents of an ampule of 100 mcg of the angiotensin antagonist of the invention are dissolved in 500 ml of a physiological salt solution and this solution is administered intravenously with a speed of about 0.5 ml per minute.

In the therapy of hypertonia, it is preferred to use preparations having a prolonged period of action.

Preparations with prolonged action are obtained by preparing zinc complex compounds of the peptides. The most advantageous method for preparing them consists in precipitating these complex compounds together with an excess of zinc ions, for example zinc chloride or zinc sulfate, if necessary in the presence of phosphate, by adjusting the pH-value to about 7.2–9, in the form of a mixture with basic zinc hydroxide or zinc phosphate. Before preparing this suspension, the angiotensin-antagonist is dissolved in water at a pH-value below 6, and then an about 5–100-fold quantity of zinc chloride or of another zinc salt, for example the sulfate, and the about 5–40 fold quantity by weight of disodium phosphate may be added. The pH-value is then adjusted with 1N—NaOH to about 7.2 to 9, preferably 7.5 to 8.5.

For producing the isotony, the required quantity of the substances usually employed for this purpose, for example NaCl, KCl, sodium phosphate or sorbitol, mannitol or lactose is added and the whole is combined with distilled water to a certain volume. The water contains conserving agents, for example benzylalcohol, phenol, a 4-hydroxy-benzoic acid ester or trichloroisobutanol in an amount of 0.05 to about 2 %, in order to assure sterility of the preparation. 1 ml of the preparation contains as single dose about 50–500 mcg of an angiotensin antagonist. The activity period of the complex is many times longer than that of the free hormone.

An angiontensin antagonist having protracted action may also be obtained by combining a. an aqueous solution of the angiotensin antagonist,
b. An aqueous solution of a gelatin derivative cross-linked with hexamethylene-diisocyanate and prepared according to the method described in German Patents Nos. 1,118,792 or 1,155,134 (hereinafter referred to as "gelatin derivative"), and
c. a neutral aqueous solution of polyphloretin phosphate, and, if desired, lyophilizing the solution so obtained.

The preparation of polyphloretin phosphate is described in German Pat. No. 929 664, Examples 1, 4 and 5.

For preparing the depot preparations, the individual components may be dissolved separately in water and the acid solution of polyphloretin phosphate is neutralized with a mineral base such as KOH, NaOH or NH$_3$ or with an organic base, for example triethylamine, N-ethyl-piperidine or an amino-acid amide.

At first, the solutions of the angiotensin antagonist and of the gelatin derivatives are combined and then the solution of polyphloretin phosphate is added. Isotony is adusted with NaCl or with a physiologically tolerated organic compound, for example an amino-acid such as sodium glutamate and the pH-value of the solution is adjusted to 5.5 to 7.5, preferably 6.5 to 7.0. The solution is filtered under sterile conditions, filled into ampules or bottles under sterile conditions and, if desired, freeze-dried.

The single dose contains about 50–500 mcg of one of the angiotensin-antagonists of the invention.

Polyphloretin phosphate and the gelatin derivative are preferably used in greater excess, at least in a 20-fold and at most in about a 500-fold quantity by weight.

The compounds of the invention do not constitute a simple mixture of the components. This is proved by the fact that, for example, the specific extinction of the angiotensin antagonist at 270–285 ω is reduced to about half the value upon addition of the gelatin derivative which is the most secure sign of the presence of a complex compound with modification of the steric structure. The activity period of the complex is many times longer than that of the free hormone.

The following Examples illustrate the invention.

EXAMPLE 1:

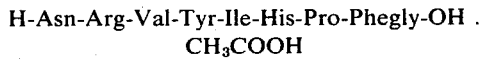

a. Z-Phegly-OH 151 g (1 mole) of L-C-phenylglycine were dissolved in 1 liter of 1N-sodium hydroxide solution, while cooling, and then 210 g of chlorocarbonic acid benzyl ester and 220 ml of 5N-sodium hydroxide solution were added dropwise within 1 hour, at 10°C, while mixing thoroughly with a vibro-mixer. Stirring was continued for 1 hour and the still alkaline aqueous solution was extracted thrice with ether. The aqueous solution was freed from residual ether by aeration and adjusted to pH 2 by means of hydrochloric acid. The product crystallized from the ice-cooled solution.

Yield: 256 g = 90% of the theory. M.P. 128°–129° C.
$[\alpha]_D = +106°$ (c=1, CH$_3$OH)

b. Z-Phegly-OBu$^t$ 500 ml of isobutylene were condensed at −65° C, with exclusion of moisture, into a suspension of 128 g (0.45 mole) of Z-phenylglycine in 900 ml of anhydrous and alcohol-free methylene chloride. 5 ml of concentrated sulfuric acid were added and the whole was shaken for 3 days in an autoclave at room temperature. After elimination by evaporation of the isobutylene and dissolution of the oily reaction product in methylene chloride, the solution was shaken with 300 ml of a 5% soda solution and water. The carbobenzoxy-C-phenylglycine-tert.butyl ester crystallized at 0° C from the methylene chloride solution that had been dried over magnesium sulfate and concentrated under reduced pressure. After trituration with petroleum ether of a low boiling point, the product was dried under reduced pressure over P$_2$O$_5$.

Yield: 93 g = 61% of the theory. M.p. 47–48°C.
$[\alpha]_D = +66.7°$ (c=1, Methanol)

c. H-Phegly-OBu$^t$ . CH$_3$COOH

Hydrogen was passed, with exclusion of air and while stirring with a vibro-mixer, through a solution of 185 g (0.54 mole) of Z-phegly-OBu$^t$ in methanol, to which 5% of the weight of the substance of palladium black had been added. After 8 hours, 0.54 mole of acetic acid (glacial acetic acid) were added. After 16 hours the hydrogenating separation of the carbobenzoxy ester was completed, the catalyst was filtered off and, after concentration of the reaction solution under reduced pressure, there were obtained colorless crystals which, after drying under reduced pressure over P$_2$O$_5$, had a melting point of 110°–112° C.

Yield: 142 g = 99% of the theory.
$[\alpha]_D = +55°$ (c=1, CH$_3$OH)

d. Z-Pro-Phegly-OBu$^t$ 22 ml of chloroformic acid ethyl ester were added dropwise, at −5° C, with exclusion of moisture, within 3 minutes, to a solution of 57 g (0.23 mole) of Z-Pro-OH and 32.3 ml (0.23 mole) of triethylamine in 500 ml of tetrahydrofurane. Stirring was continued for 3 minutes and then the ice-cold solution of 47.7 g of H-phegly-OBu$^t$ (obtained from the acetate by treatment of the ethyl acetate solution with soda solution) in 350 ml of tetrahydrofurane was added. Stirring was continued for 10 minutes at 0°C and for 90 minutes at room temperature, the mixutre was then evaporated at room temperature under reduced pressure, combined with water and the product was dissolved in ethyl acetate. The ethylacetate solution was extracted with 1N-HCl/sodium bicarbonate and water, clarified with charcoal and dried over sodium sulfate. After evaporation of the solvent, 60 g of colorless crystals melting at 98.5°–100° C were obtained.

$[\alpha]_D = +30.8°$ (c=1, ethanol)

e. H-Pro-Phegly-OBu$^t$ . X HCl 48 g (0.11 mole) of Z-pro-phegly-OBu$^t$ were dissolved in 450 ml of methanol to which 6.3 ml of glacial acetic acid had been added, and 4 g of 10 % palladium on barium sulfate were added. After the solution was blanketed with nitrogen, hydrogen was passed, while stirring thoroughly, through the suspension until the evolution of $CO_2$ was terminated (4.5 hours). After the catalyst filtered off through a silica gel clarifying layer, the pH of the suspension was adjusted to 2.7 by means of methanolic HCl, the suspension was distilled under reduced pressure at room temperature and the product was triturated thoroughly with absolute ether.

Yield: 34 g (91% of the theory) M.p. 175° C(decomposition).

$[\alpha]_D = +45°$ (c=1, ethanol)

f. Z-His-Pro-Phegyl-OBu$^t$ . HCl 9.1 g (0.03 mole) of Z-His-hydrazide were dissolved in 120 ml of 1N-HCl, while stirring, at 0° C, then 6.9 ml of a 5N-aqueous sodium nitrite solution were added dropwise. Stirring was continued for 4 minutes at 0° C and at this temperature 72 ml of a 2N-soda solution were added with caution. Then, extraction was carried out immediately with three 70 ml portions of pre-cooled ethyl acetate. The combined ethylacetate extracts were dried shortly over magnesium sulfate, while well cooling, and added to a cooled solution of 0.03 mole (9.12 g) of H-Pro-Phegly-OBu$^t$ (obtained by liberation with ammoniacal chloroform according to Hillman) in 80 ml of dimethylformamide. After 16 hours at 0° C, the solvent was distilled off in a high vacuum at room temperature, the oily residue was dissolved in ethyl acetate and the ethyl acetate solution was extracted several times with a 2N-soda solution. The ethyl acetate solution was subsequently dried over magnesium sulfate and evaporated under reduced pressure. The oil that remained behind was dissolved in methylene chloride and combined with 0.03 mole of HCl in dioxane solution. The product was then precipitated with ether.

Yield: 8.8 g (48% of the theory) of crude produce having a melting point of 105°C.

After recrystallization from a mixture of methylene chloride and ether, the product showed a melting point of 135° C and $[\alpha]_D$ of +11.2° (c = 1, ethanol).

g. H-His-Pro-Phegly-OBu$^t$ . 2 HCl 24.5 g (0.04 mole) of the carbobenzoxy-tripeptide ester were dissolved in 300 ml of absolute methanol and, after addition of 4 g of palladium on barium sulfate, hydrogenated for 12 hours as described under (e), while maintaining the pH-value at about 3.5 by dropwise addition of methanolic HCl.

Yield: 20 g (97% of the theory). M.p. 180°–185° C. $[\alpha]_D = +14.6°$ (c = 1, in ethanol).

After recrystallization from a mixture of ethanol and isopropanol (1:1), 5.2 g of product melting at 205° C $[\alpha]_D = +21°$ (c = 1, in ethanol), in addition to a 2nd fraction II, comprising 3.2 g of the melting point of 178° C $[\alpha]_D = +24°$ (c = 1, in ethanol) were obtained.

h. Z-Tyr(Bu$^t$)-Ile-OCH$_3$ 37.1 g of Z-Tyr(Bu$^t$)-OH (0.1 mole) and 27 g (0.2 mole) of 1-hydroxybenzotriazole were dissolved in 150 ml of dimethylformamide, the solution was cooled to −10° C and then a mixture of 18.1 g (0.1 mole) of H-Ile-OCH$_3$ . HCl and 15.2 ml (0.11 mole) of triethylamine in 100 ml of dimethylformamide, that had been prepared at −20° C, was added. After addition of a solution of 21 g of dicyclohexylcarbodiimide in 60 ml of dimethylformamide, stirring was continued for 5 minutes at −15° C and for 2 hours at −5° C and the whole was allowed to stand for 15 hours at −2° C. After filtration, the mixture was distilled under reduced pressure at room temperature. The oily residue was dissolved in ethyl acetate and the ethyl acetate solution was extracted several times with 1N-HCl, 2N-soda solution and water. The ethyl acetate solution was subsequently dried over magnesium sulfate and evaporated under reduced pressure. An oil was obtained which crystallized after a short time and which was recrystallized from a mixture of ethyl acetate, ether and petroleum ether.

Yield: 40 g (81% of the theory). M.p. 95°–96° C. $[\alpha]_D = -4.1°$ (c = 1, in ethanol).

i. H-Tyr(Bu$^t$)-Ile-OCH$_3$ . HCl 44 g (0.088 mole) of Z-TYr(Bu$^t$)-Ile-OCH$_3$ were dissolved in 400 ml of methanol and hydrogenated as described under (e) and worked up. Hydrogenation was completed after 4 hours. The final product solidified after working up several times with absolute ether.

Yield: 29.2 g (82 % of the theory). M.p. 162° C(decomposition).

$[\alpha]_D = +14.2°$ (c = 1, in ethanol).

k. Z-Val-Tyr(Bu$^t$)-Ile-OCH$_3$

A solution of 34.8 g (0.1 mole) of Z-Val-N-Hydroxy-succinimide ester in 250 ml of methylene chloride was added at −10° C to a solution, that had been prepared at the same temperature with exclusion of moisture, of 40 g (0.1 mole) of H-Tyr-Ile-OCH$_3$ . HCl and 13.9 ml of triethylamine in 400 ml of methylene chloride. The mixture was stirred for 2 hours at 0° C and allowed stand for 16 hours at −2° C, then distilled under reduced pressure and worked up as described under (h).

Yield: 46.8 g (79 % of the theory). M.p. 161°–163° C. $[\alpha]_D = -2.5°$ (c = L.5, in ethanol-dimethylformamide (1:1)).

l. Z-Val-Tyr(Bu$^t$)-Ile-OH 12 g (0.02 mole) of the carbobenzoxy-tripeptide ester described under (k) were dissolved in a mixture of 15 ml of methanol, 100 ml of tetrahydrofurane and 20 ml of 4N-sodium hydroxide solution. The solution was stirred for 2 hours at room temperature, then the neutralized with citric acid solution and evaporated under reduced pressure to yield a syrup. This syrup was adjusted to pH 3 with 2N-hydrochloric acid. The carbobenzoxy tripeptide derivative that precipitated was filtered off with suction, washed with water and dried under reduced pressure over $P_2O_5$.

Yield: 10.6 g (91.6 % of the theory). M.p. 168° C.

m. Z-Val-Tyr(Bu$^t$)-Ile-His-Pro-Phegly-OBu$^t$

A solution of 8.2 g of H-His-Pro-Phegly-OBu$^t$ . HCl and 3.6 ml of N-ethylmorpholine which had been prepared at −5° C with exclusion of moisture was added to a solution of 9.34 g of Z-Val-Tyr(Bu$^t$)-Ile-OH and 4.4 g of N-hydroxybenztriazole in 80 ml of dimethylformamide. 3.6 g of dicyclohexylcarbodiimide dissolved in 15 ml of dimethylformamide were added at −7° C. The whole was stirred for 3 hours at 0° C and allowed to stand for 16 hours at +4° C. After filtration, the solvent was removed by distillation in a high vacuum. The remaining oil was dissolved in ethyl acetate, extracted with 1N-NaHCO$_3$, clarified with coal and dried over magnesium sulfate. After distillation, 14.9 g (93 % of the theory) of a colorless solid product were obtained. M.p. 135° C. $[\alpha]_D = -27°$ (c = 1, in ethanol).

n) H-Val-Tyr(Bu$^t$)-Ile-His-Pro-Phegly-OBu$^t$ . CH$_3$COOH 4.5 g of the carbobenzoxy compound obtained according to (m) were dissolved in 60 ml of methanol and combined with 0.0045 mole of glacial acetic acid and 0.5 g of palladium black. After the air in the reaction vessel was replaced by nitrogen, hydrogen was passed through the well stirred reaction mixture until the evolution of $CO_2$ was completed. This was the case after about 9 hours. If the evolution of $CO_2$ during the said time decreased, it was tried to activate it again by the addition of new catalyst. When the reaction was completed, the catalyst was filtered off and the filtrate was concentrated under reduced pressure, precipitated with a mixture of ether and petroleum ether and digested with the same solvent mixture.

Yield: 2.4 g (57.7 % of the theory). M.p. decomposition from 115° C onwards. $[\alpha]_D = -10.9°$ (c = 1, in ethanol).

o. Z-Arg(Z$_2$)-Val-Tyr(Bu$^t$)-Ile-His-Pro-Phegly-OBu$^t$ 18.9 g of H-Val-Tyr(Bu$^t$). Ile-His-Pro-Phegly-OBu$^t$ were dissolved in 80 ml of DMF, then 3.6 ml of N-ethylmorpholine were added at 10°C while stirring. Then 11.52 g of H-Z-Arg(Z$_2$)-OH, 5.4 g of N-hydroxybenzotriazole and 4.5 g of dicyclohexyl-carbodiimide were added. The whole was heated to 0° C, stirred for 2 hours at this temperature and allowed to stand overnight at +4° C. After filtration and removal by distillation of the dimethylformamide under reduced pressure at room temperature, the oily residue was caused to solidify by the addition of a saturated soda solution, thoroughly triturated, filtered off with suction and washed with a small amount of water. The yield after drying in a high vacuum over $P_2O_5$ and recrystallization from methanol/H$_2$O was 17.2 g. M.p. 139° C.
$[\alpha]_D = -8.3°$ (c = 1, DMF).

p. H-Arg-Val-Tyr(Bu$^t$)-Ile-His-Pro-Phegly-OBu$^t$ . 3 HCl

A suspension of 17.0 g of carbobenzoxy-hexapeptide (o) in 700 ml of CH$_3$OH was hydrogenated as described under g). Hydrogenation was completed after 8 hours. The catalyst was removed by filtration. The methanolic solution of the heptpeptide derivative was dried under reduced pressure at room temperature, triturated with ether, filtered off with suction and dried dried under reduced pressure.

Yield: 24.2 g. M.p. decomposition from 204° C onwards.
$[\alpha]_D = +38.2°$ (c = 1, CH$_3$OH).

q. Z-Asn-Arg-Val-Tyr(Bu$^t$)-Ile-his-Pro-Phegly-Bu$^t$ 0.77 ml of N-ethylmorpholine and then 1.30 g of $N^\alpha$ -carbobenzoxy-asparagine-4-nitrophenyl ester and 970 mg of 1-hydroxybenzotriazole in 5 ml of dimethylformamide were added at −5° C to a solution of 3.4 g of the heptapeptide ester trihydrochloride prepared according to (p) in 15 ml of dimethylformamide. After the whole had stood overnight at room temperature, the solvent was distilled off under highly reduced pressure. The semi-solid residue solidified upon treatment with 2N-soda solution. It was washed thoroughly with ice-water and filtered off. The crude product was reprecipitated from methanol/dilute ammonia and glacial acetic acid/ether.

Yield: 1.4 g (54 % of the theory). M.p. 198° C.

r. Z-Asn-Arg-Val-Tyr-Ile-His-Phegly-OH . 2 HCl 2 g of the peptide derivative described under (q) were dissolved in 20 ml of 90% trifluoroacetic acid and stirred for 1 hours at room temperature. After removal of the trifluoroacetic acid by distillation under reduced pressure at +30° C, the residue was digested several times with absolute ether, filtered off with suction, dissolved in a small amount of absolute ethanol, combined with 3.3 ml of 2N-methanolic hydrochloric acid and precipitated with a mixture of 2 parts of absolute ether and 1 part of petroleum ether from the said solution.

Yield: 1.04 g. M.p. 135° C.
$[\alpha]_D = -1.2°$ (c = 1, DMF).

s. H-Asn-Arg-Val-Tyr-Ile-His-Pro-Phegly-OH . CH$_3$COOH . HCl 1 g of the afore-mentioned octapeptide derivative (r) was dissolved in 50 ml of 90% of glacial acetic acid, combined with palladium black catalyst and hydrogenated as described under (e). The reaction was completed after 2½ hours. The product was digested with absolute ether after distilling off the solvent under reduced pressure. Yield after drying over $P_2O_5$ in a high vacuum 0.720 g. M.p. 130° C.
$[\alpha]_D = -8.3°$ (c = 1, DMF).

The acetate of the peptide was prepared by filtration over an ion exchange column (Amberlite IR 45 - acetate), purified by chromatography on Sephadex LH 20 in 0.1-molar acetic acid and had then the melting point of 198° C and an $[\alpha]_D$ of −25.6° (c = 1, DMF/H$_2$O (1:1)).

Amino-acid analysis: (after hydrolysis for 72 hours of the peptide with 6N-HCl in a sealed tube at 110° C):
Asp: 1.0, Arg: 0.95, Val: 1.08, Tyr: 0.83 Ile: 0.866,His: 0.98, Pro: 1.06. Phegly: 1.01

EXAMPLE 2: H-Asp-Arg-Val-Tyr-Ile-His-Pro-Phegly-OH . CH₃COOH a.

Z-Asp(OBuᵗ)Arg-Val-Tyr-(Buᵗ)-Ile-His-Pro-Phegly-OBuᵗ

114 mg of H-Arg-Val-Tyr(Buᵗ)-Ile-His-Pro-Phegly-OBuᵗ . 3 HCl were dissolved in 1 ml of DMF and combined successively at 0° C with 43 g of N-ethylmorpholine and 45.5 mg of Z-Aspartic acidβ-tert.butyl ester-α-N-hydroxy-succinimide ester. The whole was then allowed to stand for 72 hours at +4° C, the solvent was distilled off under highly reduced pressure at room temperature, the at first oily residue was triturated twice with 0.5 ml portions of water and then several times with ether/petroleum ether. The solidified product was filtered off and dried under reduced pressure.

Yield: 86 mg. M.p. decomposition from 149° C onwards.

$[\alpha]_D = -16.2°$ (c = 0.5, DMF).

b. Z-Asp-Arg-Val-Tyr-Ile-His-Pro-Phegly-OH 80 mg of Z-Asp(OBuᵗ)-Arg-Val-Tyr(Buᵗ)-Ile-His-Pro-Phegly-OBuᵗ were dissolved at room temperature in 1 ml of trifluoroacetic acid. After the solution was stirred for 1 hour, the solvent was distilled off at +30° C under reduced pressure. The residue solidified upon trituration with absolute ether. After decantation of the ether, the residue was dissolved in 80% methanol and filtered through Amberlite IR 45 in the acetate form (3 ml). Washing was carried out with a total of 50 ml of 80% methanol. The combined eluates were distilled under reduced pressure and subsequently triturated several times with absolute ether. After drying under reduced pressure, there remained behind 52 mg of Z-octapeptide as crude product. M.p. 185° C (decomposition).

Purification by partition chromatography in a system of n-butanol/acetic acid/water (2:1:10) on Sephadex LH 20 yielded 33 mg of chromatographically pure octapeptide derivative.

Amino-acid analysis after a 72 hours' hydrolysis with 6N-HCl in a sealed tube at 110° C (only the acid and neutral amino-acids were determined):

Asp: 1.0, Pro: 1.06, Val: 1.08, Phegly: 10.1, Ile: 0.80, Tyr: 0.82.

c. H-Asp-Arg-Val-Tyr-Ile-His-Pro-Phegly-OH

Hydrogenation of 30 mg of the Z-heptapeptide prepared according to (b) was carried out as described in Example 1 (e). After the usual working up, 22 mg of chromatographically uniform final product were isolated which showed a correct amino-acid analysis.

EXAMPLE 3: H-Asp(Arg-Val-Tyr-Ile-His-Pro-Phegly-OH)-OH a.

Z-Asp(Arg-Val-Tyr(Buᵗ)-Ile-His-Pro-Phegly-OBuᵗ)-OBzl 1.14 g of H-heptapeptide hydrochloride, prepared according to Example 1 p), 0.39 ml of N-ethylmorpholine, 0.27 g of N-hydroxybenzotriazole and 0.36 g of Z-aspartic acid-α-benzyl ester (prepared according to Nefkens, Rec. Trav. Chim. 84, 1315–18 (1965)) were dissolved successively in 15 ml of dimethylformamide. After the solution was cooled to 0° C, 0.21 g of dicyclohexylcarbodiimide were added, and the whole was stirred for 2 hours at 0° C and for 3 hours at the room temperature. After filtration, the whole was subjected to evaporation under reduced pressure and the remaining crude product was digested with a saturated sodium bicarbonate solution and absolute ether.

Yield: 1.05 g. M.p. decomposition from 190° C onwards.

b.

H-Asp(Arg-Val-Tyr(Buᵗ)-Ile-His-Pro-Phegly-OBuᵗ)-OH . 2 HCl 1

The crude produce of 3 a was dissolved, without purification, in 100 ml of methanol, hydrogenated as described under 1 (g) and worked up.

Yield: 0.95 g. M.p. decomposition from 198° C onwards.

c. H-Asp(Arg-Val-Tyr-Ile-His-Pro-Phegly-OH)-OH . 2 Hcl 0.9 g of peptide, prepared according to Example 3 (b), was dissolved in 10 ml of 90% trichloroacetic acid and stirred for 1 hour at room temperature. After working up as described in Example 1 (r), there were obtained 0.75 g of H-Asp-(Arg-Val-Tyr-Ile-His-Pro-Phegly-OH)-OH . 2 HCl. The crude product was purified by chromatography on Sephadex - LH 20 in 0.1-molar acetic acid (size of the column: 25 mm ϕ, length: 2000 mm) and then showed the following amino-acid analysis:

Asp: 1.06, Arg: 0.98, Val: 1.02, Tyr: 0.99, Ile: 1.03 His: 0.98, Pro: 1.10, Phegly: 1.0.

EXAMPLE 4: β-Ala-Arg-Val-Tyr-Ile-His-Pro-Phegly-OH a.

Boc-β-Ala-Arg-Val-Tyr-(Buᵗ)-Ile-His-Pro-Phegly-OBuᵗ

43 mg of N-ethylmorpholine and 32.7 mg of Boc-β-Ala-N-hydroxysuccinimide ester were added at 0° C, while stirring, to a solution of 114 mg of H-Arg-Val-Tyr(OBuᵗ)-Ile-His-Pro-Phegly-OBuᵗ . 3 HCl (Example 1 p)) in DMF. The whole was then allowed to stand for 72 hours at +4° C and the solvent was removed by distillation under reduced pressure. The residue was digested with a small amount of water and triturated several times with a mixture of 2.5 ml of ether and 2 ml of petroleum ether. After solidification of the product, it was filtered off and dried under reduced pressure.

Yield: 96 mg. M.p. 156°–157° C.

$[\alpha]_D = -26.6°$ (c = 0.5, methanol).

b. H-β-Ala-Arg-Val-Tyr-Ile-His-Pro-Phegly-OH . 2 CH₃COOH 96 mg of Boc-β-Ala-Arg-Val-Tyr(Buᵗ)-Ile-His-Pro-Phegly-OBuᵗ were dissolved in 2 ml of 90% trifluoroacetic acid and stirred with a magnetic stirrer for 1 hour at room temperature. The trifluoroacetic acid was then eliminated by evaporation under reduced pressure. The residue was digested several times with ether and filtered off with suction.

Yield: 61 mg. M.p. 195° C (decomposition).

The crude product was purified as described in Example 1 (s) (filtration through Amberlite IR 45 - acetate and chromatography on Sephadex LH 20) and showed then the following amino-acid analysis:

β-Ala: 1.00, Arg: 0.95, Val: 1.10, Tyr: 1.05, Ile: 0.91, His: 0.98, Pro: 1.14, Phegly: 0.92.

EXAMPLE 5:
H-Sar-Arg-Val-Tyr-Ile-His-Pro-Phegly-OH a. Boc-Sar-Arg-Val-Tyr(Bu$^t$)-Ile-His-Pro-Phegly-OBu$^t$ 2.3 g of
H-Arg-Val-Tyr(Bu$^t$)-Ile-His-Pro-Phegly-OBu$^t$ . 3 HCl, 0.76 ml of N-ethylmorpholine, 650 ml of 3-hydroxy-4-oxo-3,4-dihydroquinazoline and 1.1 g of Boc-sarcosine-2,4,5,-trichlorophenyl ester were dissolved successively in 15 ml of dimethylformamide. The solution was stirred for 1 hour at 0° C, allowed to stand for 18 hours at +4° C and stirred again for 1 hour. Then, it was subjected to distillation under reduced pressure. The semi-solid residue was digested several times with a mixture of ethyl acetate and saturated sodium carbonate solution (100 ml each). The acetic acid phase which separated was washed with a small quantity of water, dried over sodium sulfate and dried at room temperature under reduced pressure. The residue solidified upon digestion with absolute ether.

Yield: 1.8 g. M.p. 158° C.
$[\alpha]_D = -15.8°$ (c = 1, DMF).

The crude product was purified by partition chromatography on Sephadex LH 20 with the solvents n-butanol/acetic acid/water (2:1:10) and sec.butanol/3% ammonium carbonate and had then a melting point of 185° C (decomposition) and an $[\alpha]_D$ of $-19.8°$ (c = 1, in DMF).

b. H-Sar-Arg-Val-Tyr-Ile-His-Pro-Phegly-OH . 2 CH$_3$COOH 0.57 g of Boc-Sar-Arg-Val-Tyr(Bu$^t$)-Ile-His-Pro-Phegly-OBu$^t$ were dissolved in 5 ml of 90% trifluoroacetic acid and stirred for 1 hour at room temperature. After removal of the solvent by distillation under reduced pressure, the residue was digested with absolute ether, dissolved in 80% methanol and filtered over 5 ml of Amberlite IR 45 - acetate form. Afterwashing was carried out with about 50 ml of 80% methanol. The combined eluates were desiccated under reduced pressure at room temperature and triturated with absolute ether.

Yield after drying under reduced pressure over P$_2$O$_5$: 260 mg. M.p. 225° C.
$[\alpha]_D = -29°$ (c = 0.5, DMF/H$_2$O (1:1)).

Further purification by column chromatography on Sephadex LH 20 in 0.1 m-acetic acid yielded a product melting at 230° C (decomposition).
$[\alpha]_D = -33.2°$ (c = 0.5, DMF/H$_2$O (1:1)).

Amino-acid analysis after a 72 hours' hydrolysis with 6N-HCl in a sealed tube:
Sar: 1.02, Arg: 0.98, Val: 0.98, Tyr: 0.90, Ile: 1.04, His: 0.95, Pro: 1.03, Phegly: 1.0.

EXAMPLE 6:
Glutaroyl-Arg-Val-Tyr-Ile-His-Pro-Phegly-OH a. Glutaroyl-Arg-Val-Tyr(BU$^t$)-Ile-His-Pro-Phegly-OBu$^t$ . HCl 114 mg of H-Arg-Val-Tyr-(Bu$^t$-Ile-His-Pro-Phegly-OBu$^t$ . 3 HCl were dissolved in 1.1 ml of pyridine and combined with 0.04 ml of N-ethylmorpholine. Then, 0.015 g of glutaric acid anhydride dissolved in 0.2 ml of dioxane were added dropwise. The whole was stirred for 5 hours at room temperature. The solvent was then removed by distillation under reduced pressure. The residue was triturated with absolute ether, 2N-acetic acid and again with absolute ether, and finally dried under reduced pressure over potassium hydroxide.

Yield: 90 mg of amorphous colorless powder which was found in thin-layer chromatogram in the system n-butanol/acetic acid/water (2:1:10) to be distinctly different from the starting material.

b. Glutaroyl-Arg-Val-Tyr-Ile-His-Pro-Phegly-OH 85 mg of glutaroyl-Arg-Val-Tyr(Bu$^t$)-Ile-His-Pro-Phegly-OBu$^{OBut}$ . HCl were dissolved in 3 ml of 90% trifluoroacetic acid and stirred for 1 hour at room temperature. The solvent was then removed by distillation under reduced pressure. The residue was washed several times with absolute ether, dissolved in 80% methanol and introduced into an ion-exchange column (Amberlite IR 45 - acetate form 10 × 60 mm). Elution was carried out with 80% methanol. The collected eluates (a total of 110 ml) were desiccated under reduced pressure at room temperature and triturated with ether. There were obtained 65 mg of a colorless amorphous powder which, when eluted with the solvents n-butanol/acetic acid/water and sec.butanol/3% ammonium acetate (2:1:10) (100:44), showed to be different from the starting material.

Amino-acid analysis after a 62 hours' hydrolipis with 6N-HCl in a sealed tube at 110° C:
Arg: 1.05, Val: 1.1, Tyr: 0.85, Ile: 1.02, His: 0.93, Pro: 1.02, Phegly: 1.0.

EXAMPLE 7: Pht-Arg-Val-Tyr-Ile-His-Pro-Phegly-OH a. Pht-OBzl)-Arg-Tyr(Bu$^1$t)-Ile-His-Pro-Phegly-OBu$^t$ 120 mg of H-Arg-Val-Tyr-(Bu$^t$)-Ile-His-Pro-Phegly-OBu$^t$ . 2 HCl, 0.04 ml of N-ethylmorpholine, 26 mg of N-hydroxybenzotriazole and 50 mg of phthalic acid-benzyl-2,4,5-trichlorophenyl ester were dissolved successively at 0° C in 2 ml of dimethylformamide. The solution was allowed to stand for 20 hours at room temperature and the solvent was then removed by distillation in a high vacuum. The residue was digested several times with absolute ether, and then with a soda solution and water. After filtration with suction and drying, there were obtained 86 mg of a colorless substance.
$[\alpha]_D = -49.4°$ (c = 0.5, DMF).

b. Pht-Arg-Val-Tyr(Bu$^t$)-Ile-His-Pro-Phegly-OBu$^t$ . CH$_3$COOH 75 mg of Phth(OBzl)-Arg-Val-Tyr-Ile-His-Pro-Phegly-OBu$^t$ were hydrogenated in the manner described under 1 (c).

Yield: 55 mg of a colorless, amorphous powder which in thin-layer chromatography with the solvents n-butanol/pyridine/glacial acetic acid/H$_2$O (30:6:20:24) showed to be different from the starting products.

c. Pht-Arg-Val-Tyr-Ile-His-Pro-Phegly-OH 55 mg of Phth-Arg-Val-Tyr(Bu$^t$)-Ile-His-Pro-Phegly-OBu$^t$ were dissolved in 0.5 ml of 90% trifluoroacetic acid, allowed to stand for 1 hour at room temperature, the trifluoroacetic acid was then removed by distillation under reduced pressure at room tenperature, the reaction product was digested with absolute ether and, dissolved in 80% methanol, filtered through a ion-exchanger column (Amberlite IR 45 - acetate form). After-washing was carried out with a total of 15 ml of 80% methanol and the combined washing solutions were dessiccated under reduced pressure. After digestion with absolute ether, 40 mg of the phthaloyl-heptapeptides could be filtered off with suction. The peptide showed in the thin-layer chromatograms in the systems sec.butanol/3% ammonium carbonate (100:44) and butanol/acetic acid/H2O (2:1:1) to have a distinctly different migration speed than the starting material and was also distinctly visible owing to the ultraviolet absorption on the uncolored plate.

Amino-acid analysis after a 72 hour' hydrolysis with 6N-HCl in a sealed tube at 110° C:

Arg: 1.05, Val: 1.1, Tyr: 0.81, Ile: 1.03, His: 0.92, Pro: 0.98, Phegly: 1.0.

EXAMPLE 8:
Succinamidyl-Arg-Val-Tyr-Ile-His-Pro-PheglyOH a. Succinamidyl-Arg-Val-Tyr(Bu$^t$)-Ile-His-Pro-PheglyOBu$^t$ 0.5 ml (4 millimoles) of N-ethylmorpholine, 178 mg of N-hydroxybenzotriazole, 234 mg (2 millimoles) of succinic acid mono-amide and 294 mg (1.42 millimoles) of dicyclohexylcarbodiimide were added successively at −5° C, while stirring, to a solution of 1.5 g (1.3 millimoles) of H-Arg-Val-Tyr-(Bu$^t$)-Ile-His-Pro-Phegly-OBu$^t$ . 3 HCl in 15 ml of dimethylformamide. The whole was stirred for 1 hour at 0° C and overnight at room temperature. The dicyclohexyl-urea that precipitated was filtered off and the solvent was removed by distillation under reduced pressure. The remaining oil was digested with a NaHCO$_3$-solution and water and was dissolved and recrystallized several times from dimethylformamide/ether/petroleum ether and from ethanol/ether.

Yield: 1.24 g. M.p. 85° C.
$[\alpha]_D = -11.3°$ (c = 1, dimethylformamide).

b. Succinamidyl-Arg-Val-Tyr-Ile-His-Pro-PheglyOH 1.2 g of the afore-mentioned succinamidyl-Arg-Val-Tyr(Bu$^t$)- )-Ile-His-Pro-Phegly-OBu$^t$ were dissolved in 15 ml of 90% trifluoroacetic acid and stirred for 1 hour at room temperature. The solvent was then removed by distillation under reduced pressure at room temperature and the residue was triturated with absolute diethyl ether. The resulting colorless powder was dissolved in 90% methanol and filtered through an ion-exchange column (Amberlite IR 45 - acetate form, 2.0 × 20 cm). Washing was carried out with 90% methanol.

The ion exchanger filtrate and the washing solution were dessiccated under reduced pressure at room temperature and, after digestion with absolute diethyl ether, filtered off with suction.

Yield: 1.1 g. M.p. 198° C.
$[\alpha]_D = -31.6°$ (c = 0.25, DMF/CH$_3$OH (1:1)).

The crude product so obtained was purified by partition chromatography on Sephadex LH 20 in a system of n-butanol/acetic acid/water (2:1:10) and had then a melting point of 219°–221° C.

The amino-acid analysis of the peptide so purified after a 72 hours' hydrolysis with 6N-HCl in a sealed tube at 110° C gave the following values*:

| Arg | Val | Tyr | Ile | His | Pro | Phegly |
|-----|-----|-----|-----|-----|-----|--------|
| 0.97 | 1.03 | 0.83 | 0.94 | 0.93 | 0.92 | 1.00 |

*not corrected with regard to the decomposition due to hydrolysis.

We claim:
1. A peptide of the formula

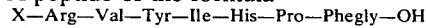

wherein X is phthalyl or the radical of an aliphatic carboxylic acid having up to 5 carbon atoms which may be mono-substituted by —COOH, —CONH$_2$, —NH$_2$, or —NHCH$_3$ or disubstituted by —NH$_2$ and —CONH$_2$ or by —NH$_2$ and —COOH, and Phegly—OH is L-C-phenyl glycine.

2. Compound as defined in claim 1 in which X is asparagine.

3. Compound as defined in claim 1 in which X is aspartic acid.

4. Compound as defined in claim 1 in which X is alanine.

5. Compound as defined in claim 1 in which X is sarcosine.

6. Compound as defined in claim 1 in which X is glutaric acid.

7. Compound as defined in claim 1 in which X is phthalic acid.

8. Compound as defined in claim 1 in which X is succinic acid monoamide.

* * * * *